April 14, 1925.

G. N. SIMPSON

CAR DUMPER

Filed March 13, 1924

Inventor:
George N. Simpson,

Patented Apr. 14, 1925.

1,533,667

UNITED STATES PATENT OFFICE.

GEORGE N. SIMPSON, OF CHICAGO, ILLINOIS.

CAR DUMPER.

Application filed March 13, 1924. Serial No. 698,898.

*To all whom it may concern:*

Be it known that GEORGE N. SIMPSON, a citizen of the United States, residing at Chicago, in the county of Cook and State of Illinois, has invented a new and useful Improvement in Car Dumpers, of which the following is a specification.

This invention relates to improvements in car dumpers and more especially to a car dumper comprising a rotatable cage mounted on supporting wheels or trunnions.

In car dumpers of this kind, the cage is frequently mounted on a slant or incline in order to assist in feeding the cars thereinto and removing them therefrom. When the cage is arranged on an incline difficulty has been encountered in rotatably supporting the same and preventing the cage from slipping downwardly. Formerly thrust wheels were installed to prevent the downward creeping of the cage, but these were objectionable due to the fact that they usually had to be mounted on vertical shafts, and suitable flat surfaces had to be provided on the sides of the ring rails of the cage for them to work against. It is one of the objects of my invention to support the cage on a slant or incline so that there will be little, if any, tendency of the cage to move longitudinally downwardly. By the use of the invention it is possible, therefore, to construct and operate heavy cages on slopes or inclines without the necessity of providing thrust wheels or reinforcements on the cage construction.

My improved car dumper can be easily and cheaply made and is strong and rugged in construction. Other features and advantages of my invention will appear more fully as I proceed with my specification.

Figure 1:
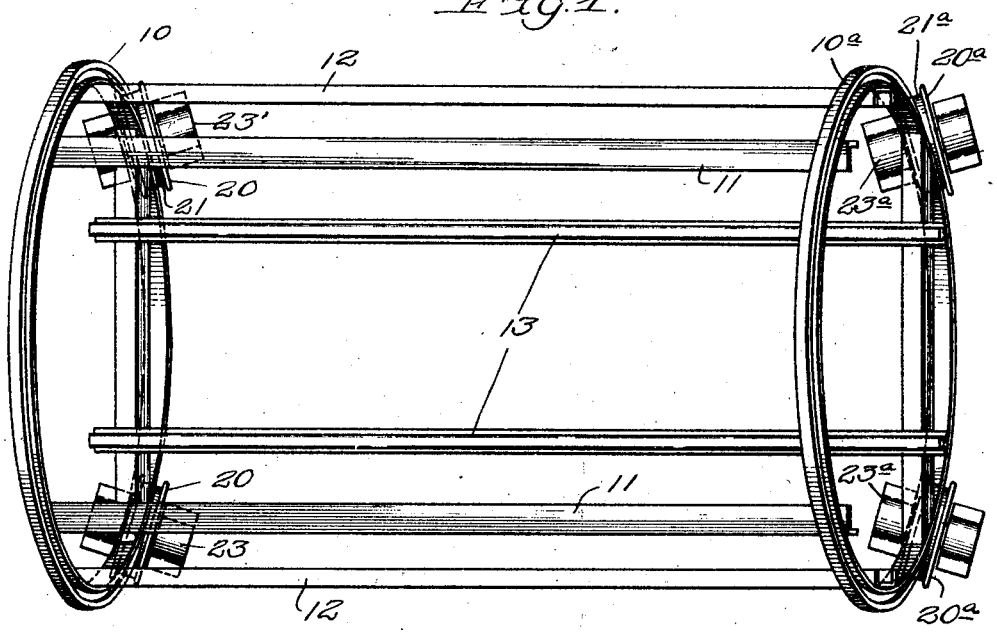
Figure 2:
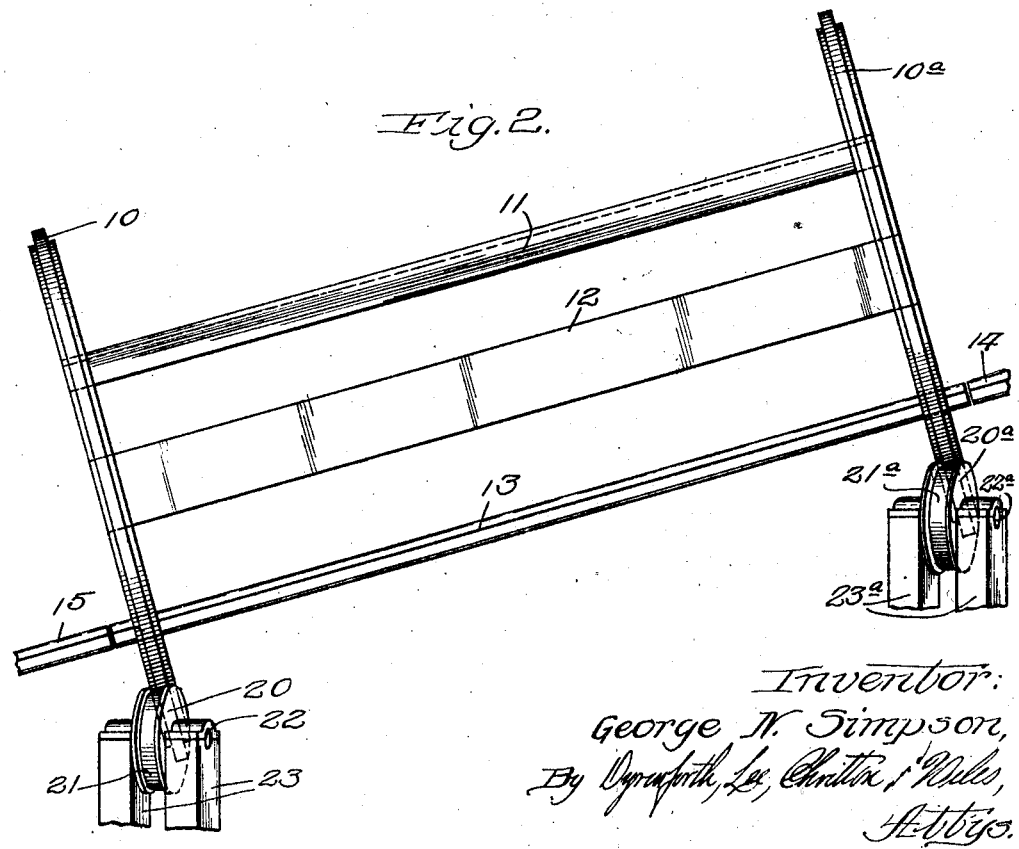

In that form of device embodying the features of my invention shown in the accompanying drawings, Fig. 1 is a top plan view of a car dumper, and Fig. 2 is a view of the same in side elevation.

As shown in the drawings, the car dumper comprises primarily a cylindrical cage formed of the two end rings 10, 10$^a$ which are here shown as formed of heavy rails. The ring rails 10, 10$^a$ are suitably joined together and braced by appropriate braces, cross-bars or struts, such as 11 and 12 in order to form a rigid cylindrical cage. At the bottom of the cage are mounted two rails 13, 13$^a$ together forming a track section for supporting the car, or cars in the cage.

14 indicates the track leading to the cage and 15 the track leading therefrom. In car dumpers of this general type, the car or cars to be dumped are fed into the cage from the track either way, usually entering by the track 15 and leaving the same way. When the cage, approach, and receiving tracks are arranged as shown, ordinarily gravity is sufficient to move the cars down the incline. The car or cars in the cage are dumped by rotation of the cage which may be complete, or partial with a return rotation. Any suitable means for rotating the cage and for holding the car or cars in the cage on the track 13 during such rotation are provided. Such means are old in the art, form no part of the present invention, and consequently are not shown here.

The rotatable cylindrical cage is supported by four wheels 20, 20$^a$. There are two pairs of these wheels. I have indicated the two wheels at the lower end of the cage by the reference numeral 20 and those at the upper end of the cage by the reference numeral 20$^a$. Likewise the reference numerals on the parts associated with the supporting wheels at the upper end of the cage bear the characteristic "a" and similar parts at the lower end of the cage have similar reference numerals but without the characteristic "a". Each of the wheels 20, 20$^a$ is provided with a peripheral groove 21, 21$^a$ adapted to receive the ring rails 10, 10$^a$. Each of the wheels 20, 20$^a$ is provided with projecting axles or trunnions 22, 22$^a$ which are suitably supported on bearing blocks 23, 23$^a$ as shown.

It is to be particularly noted that the axes of the supporting wheels 20, 20$^a$ all lie in horizontal planes. The axes of the pair of wheels 20 lie in the same plane, and the axes of the pair of wheels 20$^a$ lie in a higher plane depending upon the inclination of the cage. The bottom of the grooves 21, 21$^a$ are flat or cylindrical. And it is on these surfaces that the ring rails 10, 10$^a$ rest. Since the axes of the supporting wheels 20, 20$^a$ are on horizontal planes, it will be seen that the supporting surfaces 20, 21$^a$ are also level thus permitting the ring rails to rest thereon with very little, if any, tendency to creep downhill.

In mounting the wheels 20, 20$^a$ level, there is some tendency of each ring rail to creep across the supporting surface 21, 21$^a$. This tendency is counteracted by twisting the supporting wheels slightly so that the axes of each pair of supporting wheels do not lie parallel to each other. In other words, the axes of each pair of supporting wheels are twisted so that these axes if produced, converge in the direction in which the cage slopes downwardly.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is:

1. A device of the character described comprising, an inclined rotatable cage having a ring rail at each end, a pair of supporting wheels carrying each ring rail, the axes of each pair of supporting wheels lying in the same substantially horizontal plane and converging in the direction toward which the cage is inclined downwardly.

2. A device of the character described comprising, an inclined rotatable cage having a ring rail at each end, a pair of supporting wheels carrying each ring rail, the surface of each supporting wheel in contact with the ring rail being substantially cylindrical, the axes of each pair of supporting wheels lying in the same substantially horizontal plane, and converging in the direction toward which the cage is inclined downwardly.

3. A device of the character described comprising, an inclined rotatable cage having a ring rail at each end, a pair of supporting wheels carrying each ring rail, the axes of each pair of supporting wheels being substantially horizontal, and converging in the direction toward which the cage is inclined downwardly.

4. A device of the character described comprising, an inclined rotatable cage having a ring rail at each end, a pair of supporting wheels carrying each ring rail, the surface of each supporting wheel in contact with the ring rail being substantially cylindrical, and the axes of each pair of supporting wheels being substantially horizontal, and converging in the direction toward which the cage is inclined downwardly.

Witness my hand and seal this 7 day of March A. D. 1924.

GEORGE N. SIMPSON. [L. S.]